US012658546B2

(12) United States Patent
Klinkow et al.

(10) Patent No.: US 12,658,546 B2
(45) Date of Patent: Jun. 16, 2026

(54) BUS INTERFACE FOR A TWO-WIRE BUS WITH ADJUSTABLE PULL-UP/PULL-DOWN RESISTANCE VALUES

(71) Applicant: WAGO Verwaltungsgesellschaft mbH, Minden (DE)

(72) Inventors: Torsten Klinkow, Bad Salzuflen (DE); Matthias Kahde, Stadthagen (DE); Thorsten Lindner, Hannover (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 207 days.

(21) Appl. No.: 18/589,149

(22) Filed: Feb. 27, 2024

(65) Prior Publication Data

US 2024/0291127 A1 Aug. 29, 2024

(30) Foreign Application Priority Data

Feb. 27, 2023 (DE) ..................... 10 2023 104 775.2

(51) Int. Cl.
*H01P 1/26* (2006.01)

(52) U.S. Cl.
CPC ..................................... *H01P 1/26* (2013.01)

(58) Field of Classification Search
CPC ........................................................ H01P 1/26
See application file for complete search history.

(56) References Cited

U.S. PATENT DOCUMENTS 8,793,425 B2 * 7/2014 Yu ......................... G06F 11/267 710/110
10,230,307 B2 * 3/2019 Chen .................. H05B 45/3575
2015/0280693 A1 * 10/2015 Jung .............. H03K 19/018585 327/109
2018/0060261 A1 * 3/2018 Chhor ................. G06F 13/4282

FOREIGN PATENT DOCUMENTS

CN 206686364 U * 11/2017
CN 113641611 A 11/2021
EP 0875090 B1 * 6/1999 ........ H02J 13/00036
JP 2021068323 A * 4/2021 ........... G06F 13/385

OTHER PUBLICATIONS

Translation of EP-0875090-B1 (Year: 1999).*
Translation of CN-206686364-U (Year: 2017).*
Translation of JP-2021068323-A (Year: 2021).*

* cited by examiner

*Primary Examiner* — Henry Tsai
*Assistant Examiner* — John B Roche
(74) *Attorney, Agent, or Firm* — Muncy, Geissler, Olds & Lowe, P.C.

(57) ABSTRACT

Bus interface for a two-wire bus with adjustable pull-up/pull-down resistance values. A device has a bus interface for a two-wire bus comprising a first terminal and a second terminal for connection to the two-wire bus, a pull-up resistor device connected to the first terminal for a first conductor of the two-wire bus, and a pull-down resistor device connected to the second terminal for a second conductor of the two-wire bus. The pull-up resistor device is
(Continued)

arranged to set a pull-up resistance value based on a pull-up control signal. The pull-down resistor device is arranged to set a pull-down resistance value based on a pull-down control signal.

13 Claims, 4 Drawing Sheets

BUS INTERFACE FOR A TWO-WIRE BUS WITH ADJUSTABLE PULL-UP/PULL-DOWN RESISTANCE VALUES

This nonprovisional application claims priority under 35 U.S.C. § 119(a) to German Patent Application No. 10 2023 104 775.2, which was filed in Germany on Feb. 27, 2023, and which is herein incorporated by reference.

BACKGROUND OF THE INVENTION

Field of the Invention

The present invention relates to an interface for a two-wire bus. In particular, the present invention relates to an interface for a two-wire bus with adjustable pull-up/pull-down resistance values.

Description of the Background Art

In order to avoid reflections, termination resistors can be arranged at the ends of the bus line. When the bus is not in use, these tend to pull the voltage between the bus lines to zero. Because zero can be an undefined input level for bus subscribers, additional "pull-up" and "pull-down" resistors can be provided to prevent undefined input levels to occur when the bus is not in use.

SUMMARY OF THE INVENTION

A device according to the invention comprises a bus interface for a two-wire bus comprising a first terminal and a second terminal for connection to the two-wire bus, a pull-up resistor device connected to the first terminal for a first conductor of the two-wire bus, and a pull-down resistor device connected to the second terminal for a second conductor of the two-wire bus. The pull-up resistor device is arranged to set a pull-up resistance value based on a pull-up control signal and the pull-down resistor device is arranged to set a pull-down resistance value based on a pull-down control signal.

In this regard, the term "bus interface", can be understood to be, for example, as an interface that is arranged for connection to and communication via a bus. The bus interface can be arranged to implement the communication via the bus in accordance with a bus protocol, wherein the bus protocol can (directly or indirectly) specify when which bus subscriber is allowed to (actively) use the bus for communication. Furthermore, the term "two-wire bus", can be understood to be, for example, a bus that transmits data by mapping the data to be transmitted to a course of a voltage between two conductors. For example, the device may comprise a transceiver for communication which is connected to the first terminal and the second terminal and derives symbols representing bus communication data from an electrical voltage between the first terminal and the second terminal.

Further, the term "terminal" can be understood to be, for example, a terminal point which is arranged and provided for electrically connecting a conductor to the device. Furthermore, the term "pull-up/pull-down resistor device", can be understood to be, for example, a device which is arranged to connect the conductor connected to the "pull-up"/"pull-down" resistor device via a resistor to the positive pole of a DC voltage source of the device or to the negative pole of the DC voltage source. Furthermore, the term "resistance value", can be understood to be, for example, as the value of an ohmic resistance.

The pull-up resistor device can be designed as a digital potentiometer. Likewise, the pull-down resistor device can be designed as a digital potentiometer.

The pull-up resistor device may comprise at least one first switch, wherein the first switch is arranged to activate a first current path, which extends from the first terminal via a first pull-up resistor. The pull-down resistor device may comprise at least one second switch, wherein the second switch is arranged to activate a second current path, which extends from the second terminal via a first pull-down resistor.

The pull-up resistor device may comprise a second pull-up resistor and a third switch. Closing the third switch activates a third current path, which extends from the first terminal via the second pull-up resistor. Closing the third switch can deactivate the first current path.

The pull-down resistor device may comprise a second pull-down resistor and a fourth switch. Closing the fourth switch activates a fourth current path, which extends from the second terminal via the second pull-down resistor. Closing the fourth switch can deactivate the second current path.

The first pull-up resistor can be connected in series with the first switch. The second pull-up resistor can be connected in series with the third switch. The branches connected in series can be connected in parallel with each other.

The first pull-down resistor can be connected in series with the second switch. The second pull-down resistor can be connected in series with the fourth switch. The branches connected in series can be connected in parallel with each other.

The first pull-up resistor and the second pull-up resistor can be connected in series. The first pull-down resistor and the second pull-down resistor can be connected in series.

The device may further comprise a computing unit for executing the configuration routine. The computing unit can, for example, be designed as a controller or microcontroller. The computing unit can comprise a measurement input for evaluating voltages on the first line and on the second line, and can be arranged to output the pull-up control signal and/or the pull-down control signal based on the evaluation.

A method according to the invention comprises providing a bus interface, wherein the bus interface comprises a first input and a second input and is arranged to monitor an electrical voltage between the first input and the second input and to derive data from values of the monitored voltage, to activate, as part of a configuration routine, a first current path, which extends from the first input via a first pull-up resistor, by the bus interface, and/or to activate, as part of the configuration routine, a second current path which extends from the second input via a first pull-down resistor, by the bus interface, wherein the first current path and the second current path remain activated during a control operation of the bus interface following the configuration routine.

The method may further comprise activating, by means of the device, as a part of the configuration routine executed by the device, a third current path which extends from the first input via a second pull-up resistor, and activating, as a part of the configuration routine executed by the device, a fourth current path which extends from the second input via a second pull-down resistor.

The first pull-up resistor and the second pull-up resistor may be connected in series or in parallel. The first pull-down resistor and the second pull-down resistor may be connected in series or in parallel.

It is further to be understood that all features of the device described in the foregoing and the following may be features of the method and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
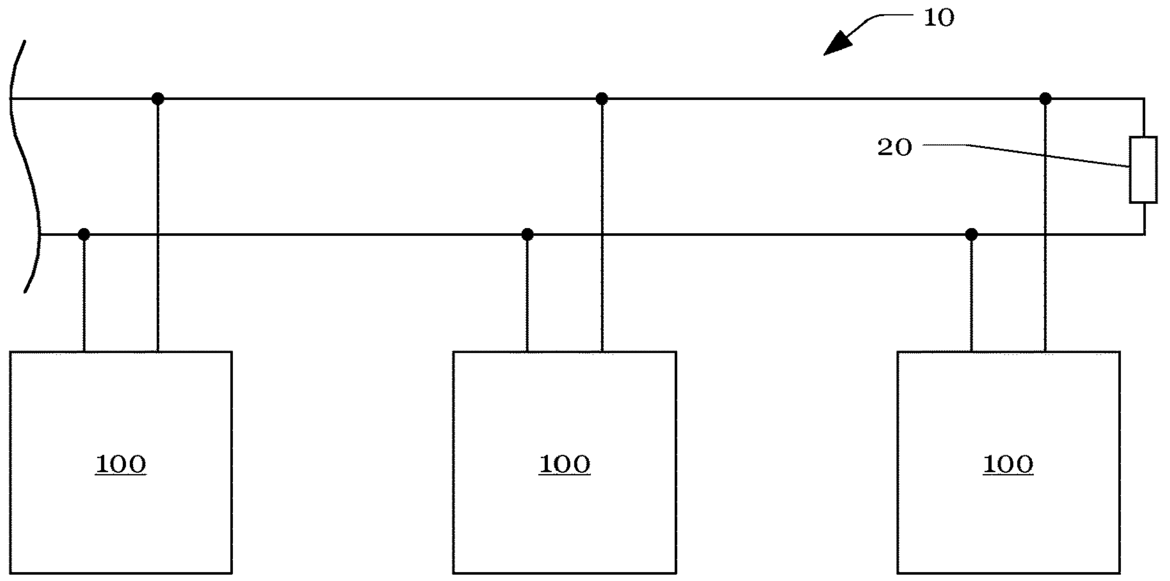
FIG. 1 is a schematic representation of a bus system.

FIG. 1 shows a two-wire bus 10 to which a plurality of devices 100 are connected. In order to avoid reflections, a termination resistor 20 is arranged at the end of the two-wire bus 10, via which the two conductors of the two-wire bus 10 are conductively connected to each other.

Figure 2:
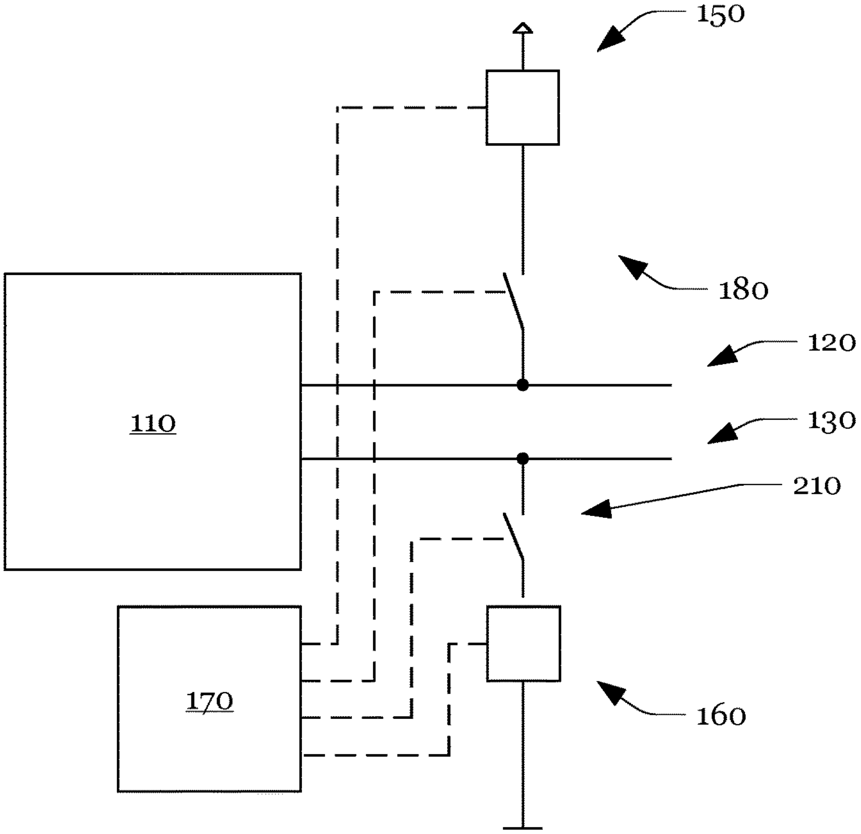
FIG. 2 is a schematic representation of a device according to a first example of the present invention.

As shown in FIG. 2, the device 100 connected to the two-wire bus is provided with a transceiver 110 for communication via the two-wire bus 10. The transceiver 110 is connected to a first terminal 120 and a second terminal 130 of the device 100, via which the device 100 is connected to the two-wire bus 10. When receiving data via the two-wire bus 10, the transceiver 110 derives symbols representing bus communication data from the electrical voltage between the first terminal 120 and the second terminal 130 (which in this case serve as inputs). When transmitting data, the transceiver 110 generates a course of the voltage representing symbols between the terminals 120 and 130.

Further, the device 100 comprises a pull-up resistor device 150 connected to terminal 120 and a pull-down resistor device 160 connected to terminal 130. The pull-up resistor device 150 is arranged to set a pull-up resistance value based on a pull-up control signal output by a computing unit 170. The pull-down resistor device 160 is arranged to set a pull-down resistance value based on a pull-down control signal output by the computing unit 170. For example, the pull-up resistor device 150 and the pull-down resistor device 160 can be designed as digital potentiometers.

Figure 3:
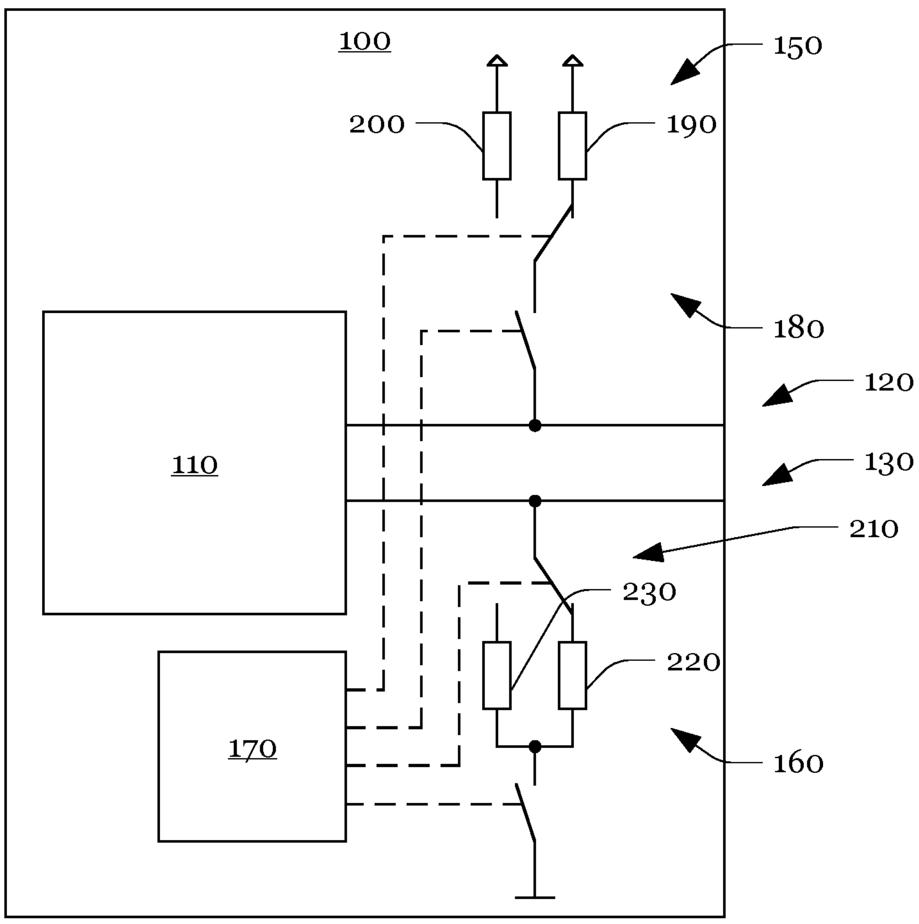
FIG. 3 is a schematic representation of a device according to a second example of the present invention.

As shown in FIG. 3, adjustable pull-up and pull-down resistance values can also be realized via a combination of switches 180 and 210 and resistors 190, 200, 220 and 230. A specific resistance value of the pull-up resistor device 150 is achieved in the device 100 shown in FIG. 3 by the fact that the switch 180 can be controlled via the pull-up control signal and the switch position determines via which of the resistors 190 and 200 the terminal 120 is connected to the positive pole of the DC voltage source supplying the device 100 with power. A specific resistance value of the pull-down resistor device 160 is achieved by the fact that the switch 210 can be controlled via the pull-down control signal and the switch position determines via which of the resistors 220 and 230 the terminal 130 is connected to the negative pole of the DC voltage source supplying the device 100 with power.

Figure 4:
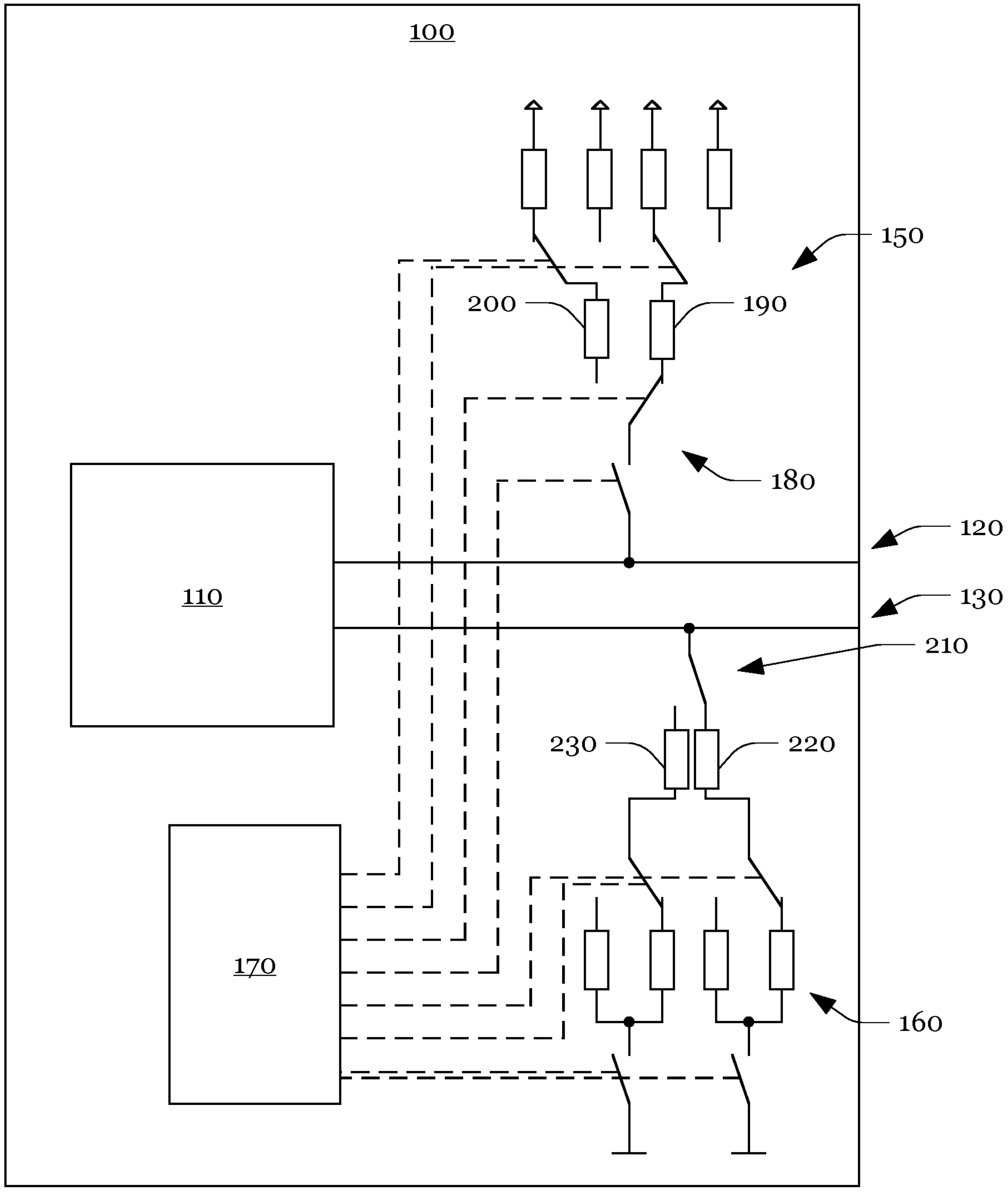
FIG. 4 is a schematic representation of a device according to a third example of the present invention.

As shown in FIG. 4, the device 100 shown in FIG. 3 can be extended by a bias network by arranging several switching stages in succession so that different resistors can be operated both in parallel and in series.

Figure 5:
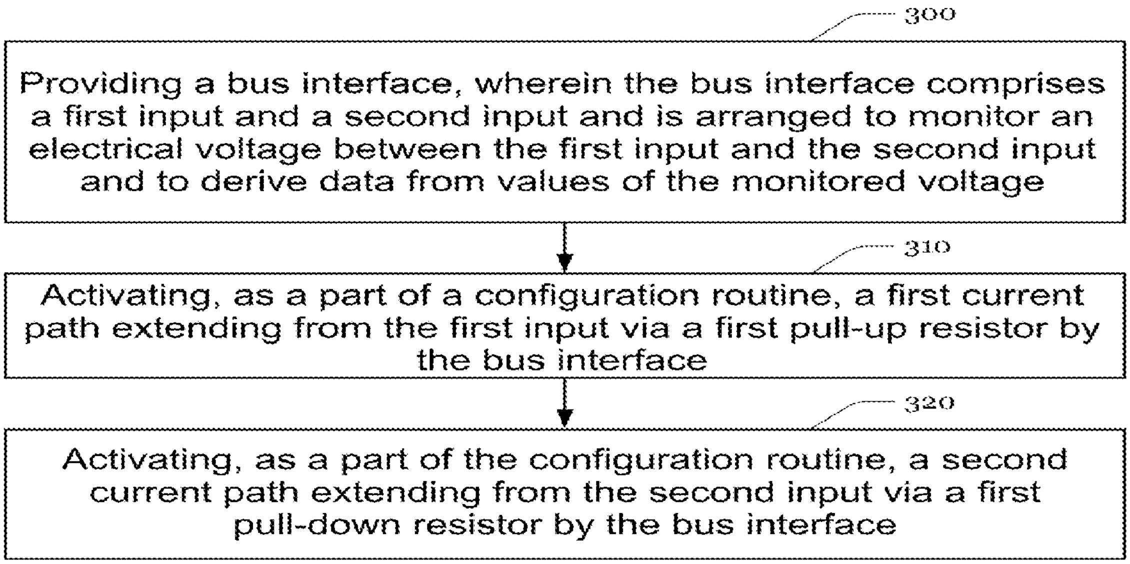
FIG. 5 is a flow diagram of a method according to the present invention.

As shown in FIG. 5, the method starts at step 300 with the provision of the bus interface, wherein the bus interface is arranged to monitor the electrical voltage between the inputs and to derive the data transmitted via the two-wire bus 10 from the values of the monitored voltage. In step 310, a current path, which extends from input 120 via pull-up resistor 190, for example, is then activated as a part of a configuration routine. In step 320, a current path, which extends from input 130 via pull-up resistor 220, for example, is then activated as a part of the configuration routine. The first current path and the second current path then remain activated during the control operation of the bus interface following the configuration routine and prevent undefined voltage levels to occur when the two-wire bus 10 is not in use.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device comprising:

a bus interface for a two-wire bus comprising a first terminal and a second terminal for connection to the two-wire bus;

a pull-up resistor device connected to the first terminal for a first conductor of the two-wire bus; and a pull-down resistor device connected to the second terminal for a second conductor of the two-wire bus, wherein the pull-up resistor device is arranged to set a pull-up resistance value based on a pull-up control signal, wherein the pull-down resistor device is arranged to set a pull-down resistance value based on a pull-down control signal, and wherein, with respect to the pull-up resistor device and the pull-down resistor device, the first terminal is connected solely to the pull-up resistor device and the second terminal is connected solely to the pull-down resistor device.

2. The device according to claim 1, wherein the pull-up resistor device comprises at least one first switch, the first switch being arranged to activate a first current path extending from the first terminal via a first pull-up resistor, and wherein the pull-down resistor device comprises at least one second switch, the second switch being arranged to activate a second current path extending from the second terminal via a first pull-down resistor.

3. The device according to claim 2, wherein the pull-up resistor device comprises a second pull-up resistor and a third switch, wherein the pull-down resistor device comprises a second pull-down resistor and a fourth switch, wherein closing the third switch activates a third current path extending from the first terminal via the second pull-up resistor, and wherein closing the fourth switch activates a fourth current path extending from the second terminal via the second pull-down resistor.

4. The device according to claim 3, wherein the first pull-up resistor in series with the first switch and the second pull-up resistor in series with the third switch are connected in parallel, and wherein the first pull-down resistor in series with the second switch and the second pull-down resistor in series with the fourth switch are connected in parallel.

5. The device according to claim 3, wherein said first pull-up resistor and said second pull-up resistor are connected in series, and wherein the first pull-down resistor and the second pull-down resistor are connected in series.

6. The device according to claim 3, wherein closing the third switch deactivates the first current path, and wherein closing the fourth switch deactivates the second current path.

7. The device according to claim 1, further comprising: a computing unit for executing the configuration routine.

8. The device according to claim 7, wherein the computing unit comprises a measurement input for evaluating voltages on the first line and on the second line and outputting the pull-up control signal and/or the pull-down control signal based on the evaluation.

9. A device comprising:

a bus interface for a two-wire bus comprising a first terminal and a second terminal for connection to the two-wire bus;

a pull-up resistor device connected to the first terminal for a first conductor of the two-wire bus; and a pull-down resistor device connected to the second terminal for a second conductor of the two-wire bus; and a transceiver for communication, which is connected to the first terminal and the second terminal and derives symbols representing bus communication data from an electrical voltage between the first terminal and the second terminal, wherein the pull-up resistor device is arranged to set a pull-up resistance value based on a pull-up control signal, and wherein the pull-down resistor device is arranged to set a pull-down resistance value based on a pull-down control signal.

10. A method comprising:

providing a bus interface, wherein the bus interface comprises a first input and a second input and is arranged to monitor an electrical voltage between the first input and the second input and to derive data from values of the monitored voltage; and activating, as a part of a configuration routine, a first current path, which extends from the first input via a first pull-up resistor, by the bus interface and/or activating, as a part of the configuration routine, a second current path, which extends from the second input via a first pull-down resistor, by the bus interface, wherein the first current path and the second current path remain activated during a control operation of the bus interface subsequent to the configuration routine.

11. The method according to claim 10, further comprising:

activating, as a part of the configuration routine executed by the device, a third current path extending from the first input via a second pull-up resistor by the device; and activating, as a part of the configuration routine executed by the device, a fourth current path extending from the second input via a second pull-down resistor by the device.

12. The method according to claim 11, wherein the first pull-up resistor and the second pull-up resistor are connected in parallel, and wherein the first pull-down resistor and the second pull-down resistor are connected in parallel.

13. The method according to claim 11, wherein the first pull-up resistor and the second pull-up resistor are connected in series, and wherein the first pull-down resistor and the second pull-down resistor are connected in series.

* * * * *